United States Patent
Schraeder

(10) Patent No.: US 8,826,635 B2
(45) Date of Patent: Sep. 9, 2014

(54) COMBINE HARVESTER WITH FEEDERHOUSE ARRANGEMENT

(71) Applicant: Deere & Company, Moline, IL (US)

(72) Inventor: John A Schraeder, Geneseo, IL (US)

(73) Assignee: Deere & Company, Moline, IL (US)

( * ) Notice: Subject to any disclaimer, the term of this patent is extended or adjusted under 35 U.S.C. 154(b) by 46 days.

(21) Appl. No.: 13/760,983

(22) Filed: Feb. 6, 2013

(65) Prior Publication Data

US 2014/0215992 A1    Aug. 7, 2014

(51) Int. Cl.
*A01D 41/14* (2006.01)
*A01D 41/06* (2006.01)
*A01D 41/02* (2006.01)

(52) U.S. Cl.
CPC ............... *A01D 41/06* (2013.01); *A01D 41/02* (2013.01)
USPC ........................................ 56/10.2 E; 56/208

(58) Field of Classification Search
USPC .......... 56/10.2 E, 14.9–15.2, 15.7–15.9, 17.1, 56/208, DIG. 10, DIG. 14, DIG. 16
See application file for complete search history.

(56) References Cited

U.S. PATENT DOCUMENTS 4,641,490 A * 2/1987 Wynn et al. ................. 56/10.2 E
6,510,680 B2 * 1/2003 Uhlending et al. ............. 56/208
6,826,894 B2 * 12/2004 Thiemann et al. ......... 56/10.2 E

* cited by examiner

*Primary Examiner* — Alicia Torres

(57) ABSTRACT

A combine harvester (100) comprises a feederhouse (104) pivotally coupled to a forward end of the chassis (144) of the combine harvester (100). The feederhouse (104) comprises a front frame (120) pivotally coupled to a front end of the feederhouse (104). A feederhouse lift motor (141) is coupled at its rear end to the chassis (144) and at its front end to the front frame (120). A pivot motor (152) is coupled to and between the front end of the feederhouse (104) and the front frame (120) to pivot the front frame (120) with respect to the front end of the feederhouse (104).

15 Claims, 4 Drawing Sheets

COMBINE HARVESTER WITH FEEDERHOUSE ARRANGEMENT

FIELD

The field is combine harvesters. More particularly, the field is mounting structures for supporting headers on combine harvesters.

BACKGROUND

Combine harvesters travel over the ground through agricultural fields harvesting crop. Combine harvesters include a self-propelled vehicle with internal threshing, separating, and cleaning mechanisms. Typically a tank or other storage bin is provided on the self-propelled vehicle to receive grain that is separated from material other than grain (MOG) such as stalks, stems, cobs, rocks, and sticks.

A feederhouse is pivotally coupled to and extends forward from the front of the vehicle. The feederhouse is supported on the self-propelled vehicle to support a harvesting head or "header" and pivot up and down. As the feederhouse pivots up and down with respect to the self-propelled vehicle, the header is raised or lowered with respect to the ground. In this manner, by adjusting the pivotal position of the feederhouse with respect to the self-propelled vehicle, the header can be properly positioned with respect to the crop plants in the field that the header is harvesting.

The header is an elongate, laterally-extending structure that engages crop plants adjacent to the ground, severs them from the ground, and conveys the severed plants inwardly toward the center of the header. Once the severed crop plants reach the center of the header, they are conveyed through an aperture in the center of the header into the open front end of the feederhouse.

The feederhouse itself is a generally hollow boxlike structure, having a conveyor disposed inside the boxlike structure that receives the severed crop plants from the header, carries them upward and rearward over the length of the feederhouse, and deposits them in the self-propelled vehicle itself for further processing.

In recent years, headers have grown quite large, and heavy. 30 years ago, a harvesting head might extend 4 m from side to side. Currently, headers are currently being designed that extend 20 m from side to side.

Headers that are 5 times larger than they were 30 years ago are now imposing significant stresses on the feederhouse and supporting members. Not only do they have an increased weight, which requires the feederhouse is to be made of stronger and heavier materials. Additional weight, however, requires additional fuel to drive the combine harvester through the field. Even further, the additional weight pressing downward upon the wheels of the combine harvester compacts the soil, thereby reducing its crop yield.

What is needed, therefore, is an improved feederhouse arrangement that permits the feederhouse to be made of lighter and/or thinner materials.

What is also needed is an improved feederhouse arrangement that permits the harvesting head to follow the ground contours more accurately.

It is an object of this invention to provide such a system.

SUMMARY

In one arrangement, a combine harvester includes a self-propelled vehicle with a feederhouse extending forward therefrom. At least one lift cylinder is coupled to the feederhouse and to the chassis of the self-propelled vehicle. The feederhouse comprises a tubular structure that is generally rectangular in cross section and is open at its front end and its rear end. The feederhouse also comprises a generally rectangular frame that extends about the rectangular opening of the front end of the tubular structure. The rectangular frame is pivotally coupled to the front end of the tubular structure on the left side and the right side of the feederhouse. The rectangular frame pivots with respect to the feederhouse about a generally horizontal and laterally extending pivotal axis. Two feederhouse lift cylinders are provided that are coupled at their rear ends to the chassis of the combine harvester. The front ends of the two feederhouse lift cylinders are coupled to the rectangular frame. The feederhouse further comprises an additional hydraulic cylinder that is coupled at one end to the rectangular frame, and coupled at the other end to the tubular structure. This additional hydraulic cylinder pivots the rectangular frame with respect to the tubular structure about the laterally extending pivotal axis when the additional hydraulic cylinder is extended and retracted.

In another arrangement, a combine harvester has a front end facing in a forward direction of harvesting travel and a chassis, the combine harvester comprising a self-propelled vehicle having a chassis; a feederhouse extending forward from the self-propelled vehicle, the feederhouse having a front end and a rear end, wherein the rear end of the feederhouse is pivotally coupled to the chassis to pivot with respect to the chassis about a first pivot axis that extends generally horizontally and laterally, the feederhouse further comprising a front frame pivotally coupled to the front end to pivot with respect to the front end second pivot axis that extends generally horizontally and laterally; a first feederhouse lift motor coupled to the chassis at a first end of the first feederhouse lift motor and coupled to the front frame at a second end of the first feederhouse lift motor; and a first pivot motor coupled to the front end at one end, and coupled to the front frame at the other end.

The feederhouse may enclose an endless belt conveyor. The endless belt conveyor may comprise an endless belt, and may further comprise a front roller and a rear roller about which the endless belt recirculates. The front roller may have a rotational axis, and further the rotational axis of the front roller may be coaxial with the second pivot axis. The rear roller may have a rotational axis and further the rotational axis of the rear roller may be coaxial with the first pivot axis. The second end of the first feederhouse lift motor may be coupled to the front frame to pivot about a third pivot axis with respect to the front frame. The first end of the first feederhouse lift motor may be coupled to the chassis to pivot about a fourth pivot axis with respect to the chassis. The third pivot axis maybe disposed below the second pivot axis. The third pivot axis maybe disposed below the second pivot axis and the fourth pivot axis maybe disposed below the first pivot axis. A distance between the second pivot axis and the third pivot axis may be less than or equal to the distance between the first pivot axis and the fourth pivot axis. The front frame may be configured to support a harvesting head having a front portion and a rear portion. The first pivot motor when actuated may be disposed to raise or lower the rear portion of the harvesting head while maintaining the front portion of the harvesting head at a constant height. The first pivot motor may be disposed to pivot the harvesting head with respect to the ground about an axis of rotation disposed adjacent to the front portion of the harvesting head. The harvesting head may comprise a cutter bar and the axis of rotation may be disposed adjacent to the cutter bar.

DETAILED DESCRIPTION

Figure 1:
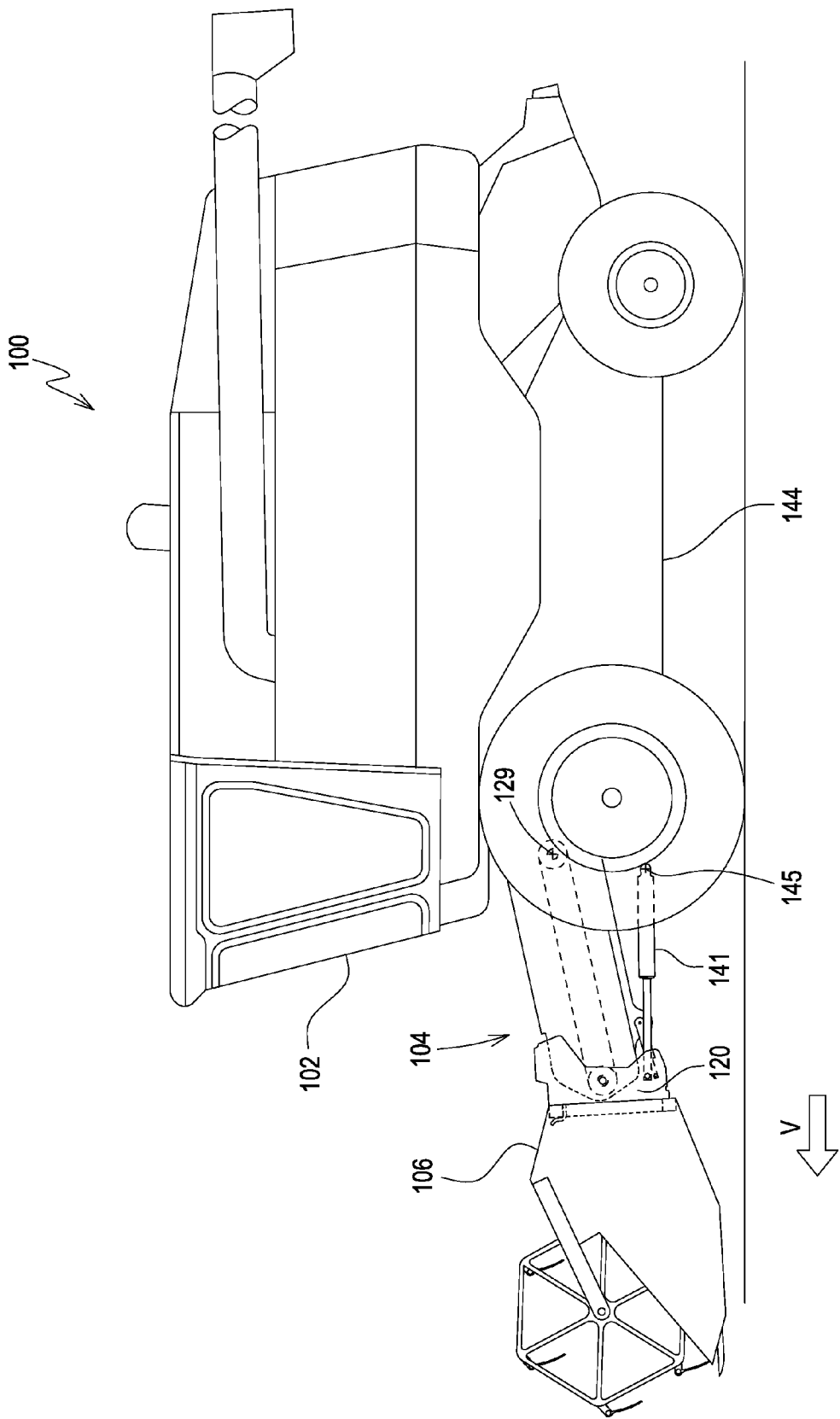
FIG. 1 is a side view of a combine harvester in accordance with the present invention.

Herein, the terms "horizontal" or "horizontally" means horizontally with respect to the agricultural field when the combine harvester 100 is on the ground harvesting crop. The terms "transverse" or "transversely" means transverse to the forward direction of travel "V" of the combine harvester 100 as it travels through the field in a straight line harvesting crops.

Referring to the Figures, a combine harvester 100 comprises a self-propelled vehicle 102, a feederhouse 104, and a harvesting head 106. The feederhouse 104 is in the form of a boxlike structure that encloses a conveyor 110 of the endless belt type. The conveyor 110 includes a front roller 112 and a rear roller 114 about which an endless belt 116 reciprocates.

The feederhouse 104 is pivotally coupled to the front of the self-propelled vehicle 102 to pivot up and down about a pivot axis 129. Pivot axis 129 extends generally perpendicular (or transverse) to the direction of travel "V" of the combine harvester 100. The pivot axis 129 also extends horizontally.

The feederhouse 104 further comprises a front frame 120 that is generally rectangular, extending laterally and vertically. Front frame 120 comprises a coupler 122 that engages and supports a harvesting head 106 on front frame 120. The coupler 122 in the illustrated arrangement comprises a pair of hooks that extend forward and then upward from an upper laterally extending member 126 of front frame 120.

The feederhouse 104 further comprises a housing 128 that is pivotally coupled to the chassis of the self-propelled vehicle 102 at the rear end 130 of the housing 128, and is pivotally coupled to the front frame 120 at the front end 132 of the housing 128. The housing 128 pivots with respect to the chassis of the self-propelled vehicle 102 about the pivot axis 129, which axis extends laterally and horizontally. The pivot axis 129 is coaxial with the rotational axis of the rear roller 114.

Two pivotal couplings 134, 136, are provided to couple the front frame 120 to the housing 128. The two pivotal couplings 134, 136 are disposed on the left and the right side of the feederhouse 104. The two pivotal couplings 134, 136 together define a generally horizontal and laterally extending pivot axis 138 about which the front frame 120 pivots with respect to the housing 128. The two pivotal couplings 134, 136 are disposed near the vertical midpoint of the front frame 120, and thus constrain the front frame 120 to pivot with respect to the housing 128 about the vertical midpoint of the front frame 120 (i.e. the location of the pivot axis 138). Pivot axis 138 is coaxial with the rotational axis of front roller 112.

The harvesting head 106 includes a laterally extending frame member 140 that is engaged by the coupler 122 and is thereby supported on the front frame 120. Frame member 140 extends substantially the entire width of the harvesting head 106.

The weight of the harvesting head 106 is communicated to the frame member 140 and thence to the front frame 120. However, a substantial portion of the load of the harvesting head 106 is communicated from the front frame 120 to the feederhouse lift motors 141 and thence to the chassis 144. This permits the weight of housing 128 to be reduced.

Feederhouse lift motors 141 are provided to raise and lower the feederhouse 104. One feederhouse lift motor 141 is provided on the left side of the feederhouse 104, and one feederhouse lift motor 141 is provided on the right side of the feederhouse 104. Feederhouse lift motors 141 raise and lower the feederhouse 104 by rotating the feederhouse 104 about pivot axis 138.

The feederhouse lift motors 141 are shown herein as hydraulic cylinders 142, 143. Hydraulic cylinders 142, 143 are pivotally coupled to the chassis 144 of the self-propelled vehicle 102 at a rear end 146 of the hydraulic cylinders 142, 143 to pivot with respect to the chassis 144 of the self-propelled vehicle 102 about a pivot axis 145. While two feederhouse lift motors 141 are shown herein, one would be sufficient. Pivot axis 145 extends horizontally and generally laterally.

The hydraulic cylinders 142, 143 are coupled to the front frame 120 at front ends 148 of the hydraulic cylinders 142, 143. The hydraulic cylinders 142, 143 operate by extending and retracting, thereby increasing and decreasing the distance between their respective front ends 148 and their respective rear ends of the hydraulic cylinders 142, 143. This extension and retraction occurs by filling and emptying the hydraulic cylinders 142, 143 with hydraulic fluid.

The front ends 148 of hydraulic cylinders 142, 143 are pivotally coupled to the front frame 120 at pivot points 150. The pivot points 150 are located on the left side and the right side of the feederhouse 104. The pivot points 150 define a pivot axis 151 of relative movement between the front ends 148 and the front frame 120. The pivot axis 151 extends generally horizontally and laterally. The pivot points 150 are located below pivotal coupling 134 and pivotal coupling 136. Thus, pivot axis 151 is generally parallel to and below pivot axis 138.

Two pivot motors 152 are provided to pivot the front frame 120 with respect to the front end 132 of housing 128. One pivot motor 152 is provided on the left side of the feederhouse 104, and one pivot motor 152 is provided on the right side of the feederhouse 104. Pivot motors 152 are disposed to pivot the front frame 120 with respect to the front end 132 about pivot axis 138. While two pivot motors 152 are illustrated herein, one would be sufficient.

Pivot motors 152 are shown herein as hydraulic cylinders 154, 156. One end 158 of hydraulic cylinders 154, 156 is pivotally coupled to the front frame 120. End 158 is a front end. A second end 160 of hydraulic cylinders 154, 156 is pivotally coupled to the front end 132 of housing 128. Second ends 160 are rear ends.

The hydraulic cylinders 154, 156 operate by extending and retracting, thereby increasing and decreasing the distance between their respective front ends 158 and rear ends 160. This extension and retraction occurs by alternately filling and emptying hydraulic fluid from the hydraulic cylinders 154, 156.

Figure 2:
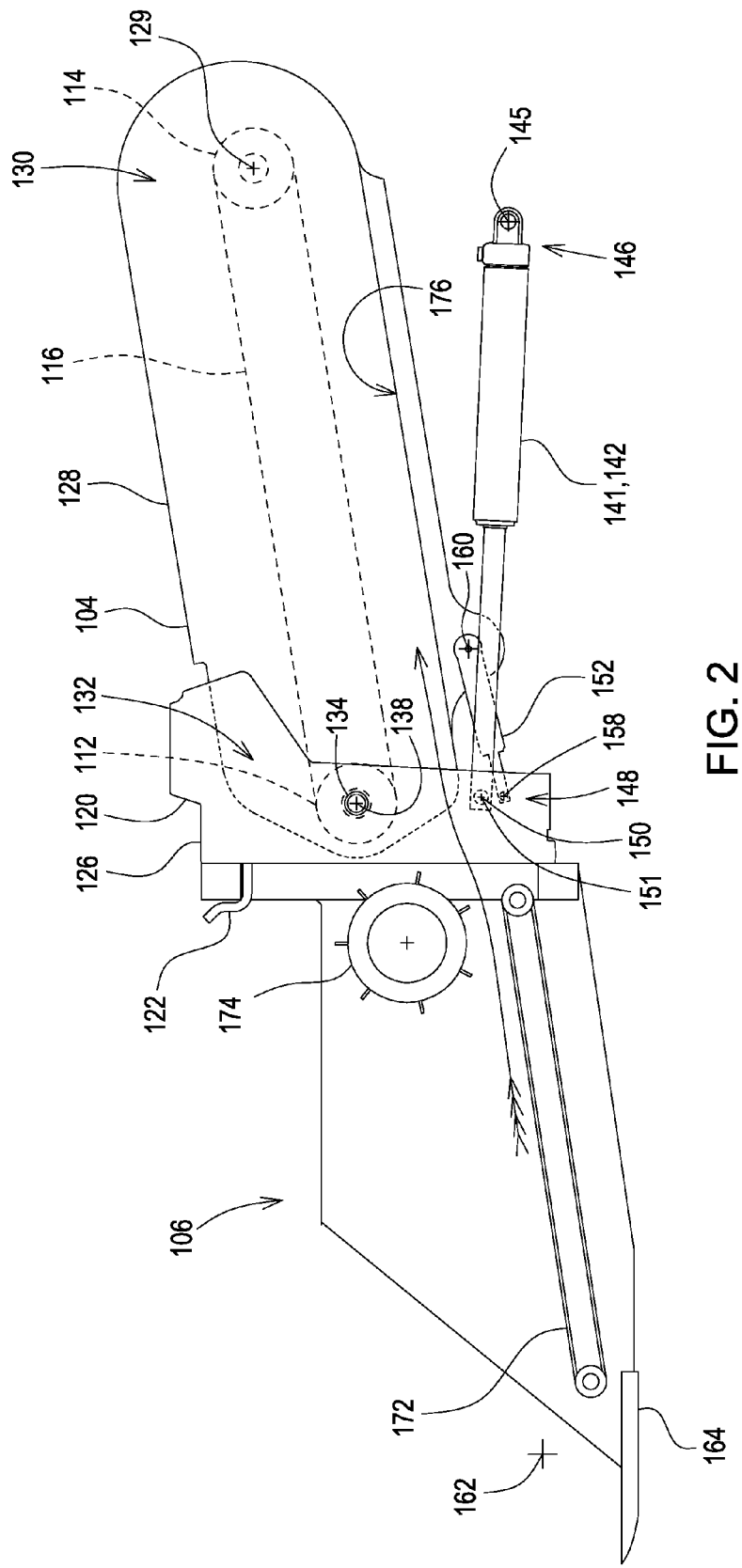
FIG. 2 is a detailed side view of the feederhouse of the combine harvester of FIG. 1 taken at section line 2-2 in FIG. 3 with the reel shown in FIG. 1 removed.
Figure 3:
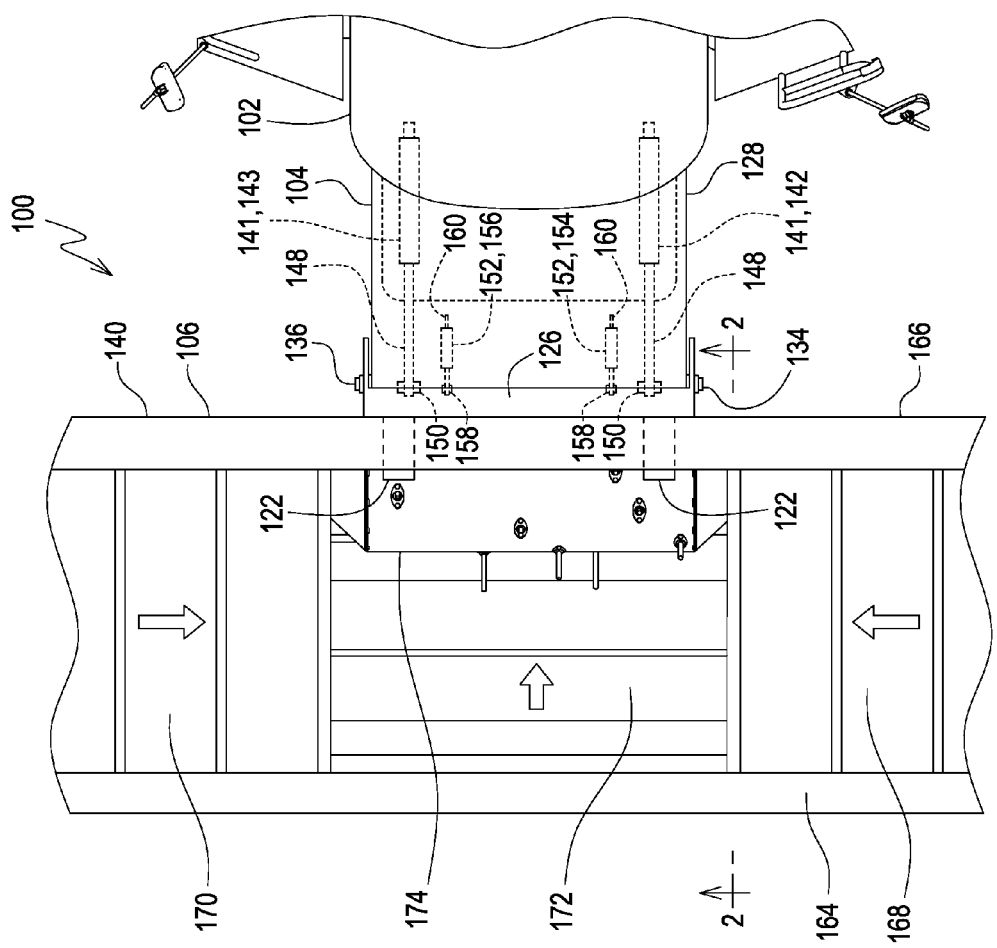
FIG. 3 is a plan view of the feederhouse of FIGS. 1 and 2.

Pivot axis 145 is disposed below and slightly forward of pivot axis 129. Similarly, pivot axis 151 is disposed below pivot axis 138. The distance between pivot axis 151 and pivot axis 138 is smaller than the distance between pivot axis 145 and pivot axis 129. As a result, whenever pivot motors 152 increase in length, two things occur: the front frame 120 tilts clockwise (as shown in FIG. 2) and the front end of the feederhouse 104 is lowered toward the ground. Furthermore, whenever pivot motors 152 decrease in length, two opposite things occur: the front frame 120 tilts counterclockwise (as shown in FIG. 2) and the front end of the feederhouse is raised higher above the ground. The distances between pivot axis 145 and pivot axis 129, and the distance between pivot axis 151 and pivot axis 138 can be varied such that a chosen point on the harvesting head 106 is maintained a relatively constant distance from the ground over a range of extensions and retractions of pivot motors 152.

The relative lengths of the feederhouse 104, the feederhouse lift motors 141, the distance between pivot axis 145 and pivot axis 129, and the distance between pivot axis 151 and pivot axis 138 are chosen such that the harvesting head 106 rotates about an instantaneous axis of rotation 162 that is disposed above a forward portion of the harvesting head 106. Rotation about the instantaneous axis of rotation 162 occurs whenever the pivot motors 152 are actuated. In the illustrated arrangement, "actuation" means the extension or retraction of the hydraulic cylinders 154, 156.

The effect of rotating the harvesting head 106 about the instantaneous axis of rotation 162 is that portions of the harvesting head immediately underneath the instantaneous axis of rotation 162 generally move fore and aft, but do not move up and down. On the other hand, the rear portion of the harvesting head 106 moves predominantly up and down as the pivot motors 152 are actuated.

As a result, places on the harvesting head 106 that are adjacent to a forward edge of the harvesting head 106 (i.e. near the cutter bar 164 and therefore generally underneath instantaneous axis of rotation 162) are maintained at a relatively constant height above the ground as pivot motors 152 are actuated relative to the movement of the rear portion of the harvesting head 106.

This has the advantage of permitting the pivot motors 152 to change the angle of attack of the harvesting head 106 with respect to the ground while keeping the distance between the cutter bar 164 and the ground relatively constant.

In one prior art arrangement, the forward end of the feederhouse lift motors 141 are coupled directly to the forward end of the housing 128. As a result, when the pivot motors 152 are actuated, the entire harvesting head 106 pivots about pivot axis 138. But pivot axis 138 is disposed adjacent to the rear end of the harvesting head 106 in this prior art arrangement, and thus the forward portion of the harvesting head 106 (including the cutter bar 164) moves up and down to a much greater extent than the rear portion of the harvesting head 106 in this prior art arrangement.

Another way of expressing the function of the illustrated arrangement is that an arrangement in which the distance between pivot axis 151 and pivot axis 138 is smaller than the distance between pivot axis 129 and pivot axis 145 will cause a harvesting head 106 supported on the combine conveyor 110 to change its height less at a more forward portion of the harvesting head 106 than at a more rearward portion of the harvesting head 106 when the pivot motor 152 is actuated. A necessary but not sufficient condition for pivoting the harvesting head 106 about a forward pivot point (such as instantaneous axis of rotation 162) is coupling the forward ends 148 of the feederhouse lift motors 141 not to the front end 132 of the housing 128 (as in the prior art arrangement discussed immediately above), but to couple the forward ends 148 of the feederhouse lift motors 141 to the front frame 120.

Figure 4:
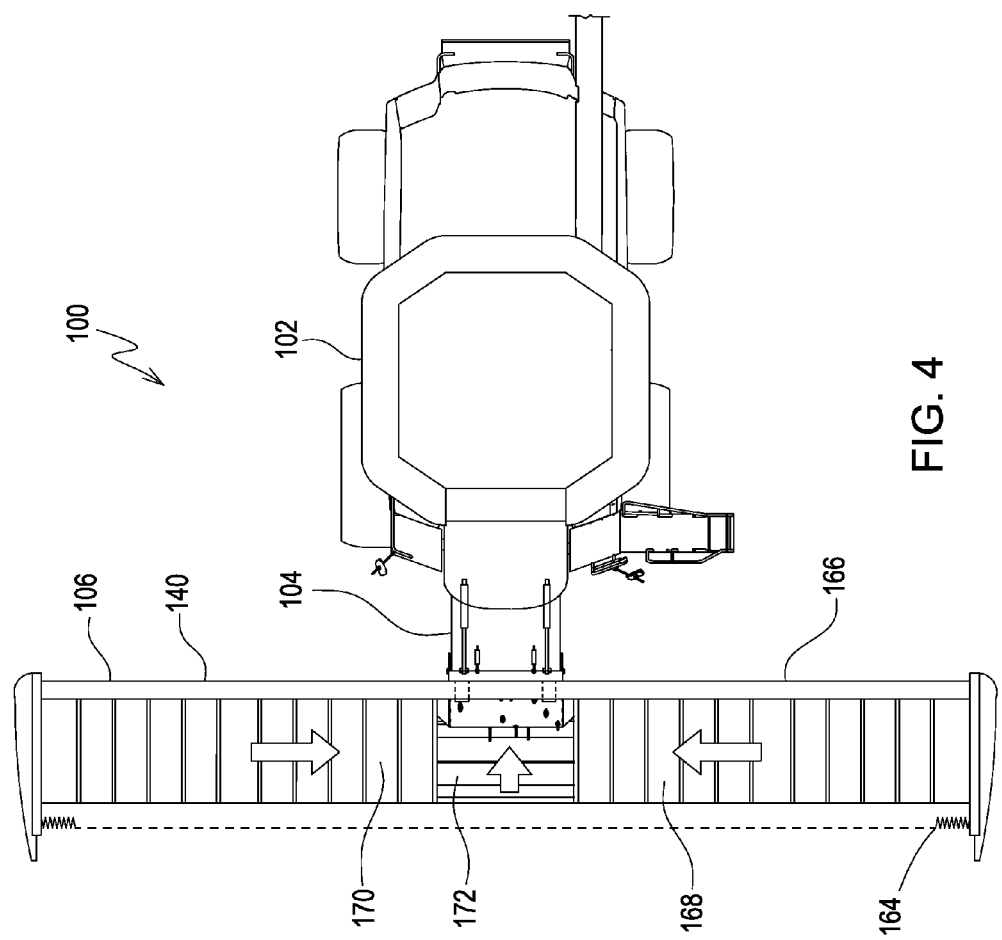
FIG. 4 is a plan view of the combine harvester of FIG. 1.

Referring to FIG. 4 in particular, harvesting head 106 comprises an elongate frame 166 on which are supported a left side endless belt conveyor 168 that has an upper surface that moves in the direction indicated by the superimposed arrow when the combine harvester 100 is traveling through the field harvesting crop.

Harvesting head 106 also comprises a right side endless belt conveyor 170 that has an upper surface that moves in the direction indicated by the superimposed arrow when the combine harvester 100 is traveling through the field harvesting crop.

The harvesting head 106 also comprises a center endless belt conveyor 172 that has an upper surface that moves in the direction indicated by the superimposed arrow when the combine harvester 100 is traveling through the field harvesting crop.

The harvesting head 106 also comprises the cutter bar 164 which extends substantially the entire width of the harvesting head 106 and is disposed to sever the stalks of crop plants adjacent to the ground such that they fall backwards on to the left side endless belt conveyor 168, the right side endless belt conveyor 170 and the center endless belt conveyor 172.

A guide roller 174 is provided adjacent to the opening of the feederhouse 104 just above the center endless belt conveyor 172 to receive cut crop material conveyed inwardly from the left side endless belt conveyor 168 and the right side endless belt conveyor 170, and the cut crop material conveyed rearward by center endless belt conveyor 172.

Referring now to FIG. 2, the cut crop material is carried rearward in the form of a thick mat of cut crop material on the top surface of the center endless belt conveyor 172 and underneath the guide roller 174. The cut crop material then passes through a generally rectangular aperture in the front frame 120 and is deposited on the inside surface of floor 176 of feeder house 104. The bottom surface of the bottom run of endless belt 116 engages the top surface of the crop mat and pulls it upward from the entrance of the feederhouse 104 adjacent to the harvesting head 106 to the exit of the feederhouse 104 adjacent to rear roller 114. This crop flow path is indicated by the arrow shown in FIG. 2.

By advantageously locating the pivot axis 138 at the center of rotation of front roller 112, this crop flow path can be maintained with relatively few restrictions caused by changes in the length of the pivot motors 152.

The arrangements illustrated and discussed herein are not the only arrangements of the invention that are possible. The arrangements of the invention are limited only by the scope of the claims. Alternative arrangements of the present invention are also possible.

In another arrangement, for example, the distance between the pivot axis 145 and the pivot axis 129 and the distance between the pivot axis 151 and the pivot axis 138 can be equal. In this arrangement, the actuation of the pivot motors 152 would not change the angle of the harvesting head 106 with respect to the ground, but would merely raise the harvesting head 106 with respect to the ground or lower the harvesting head 106 with respect to the ground. The angle of the harvesting head with respect to the ground would be varied by changing the length of the feederhouse lift motors 141.

In another arrangement, the various connection points between the mechanical elements can be arranged such that the distance between pivot axis 145 and pivot axis 129 can be less than the distance between the pivot axis 151 and the pivot axis 138. In this arrangement, the actuation of the pivot motors 152 would cause the front portion of the harvesting head 106 to move up and down to a greater extent than the rear portion of the harvesting head 106 whenever the pivot motors 152 are actuated.

In the arrangements illustrated herein, the feederhouse lift motors 141 and the pivot motors 152 are shown as elongate members, and are called herein "hydraulic cylinders". They need not be hydraulic cylinders, however. Linear or rotary actuators of the pneumatic, electric, or hydraulic type may be used.

I claim:

1. A combine harvester (100) having a forward direction of harvesting travel over ground, the combine harvester (100) comprising:
   a self-propelled vehicle (102) having a chassis (144);
   a feederhouse (104) extending forward from the self-propelled vehicle (102), the feederhouse (104) further comprising a front end (132) and a rear end (130), wherein the rear end (130) of the feederhouse (104) is pivotally coupled to the chassis (144) to pivot with respect to the chassis (144) about a first pivot axis (129) that extends generally horizontally and laterally, the feederhouse further comprising a front frame (120) pivotally coupled to the front end (132) to pivot with respect to the front end (132) second pivot axis (138) that extends generally horizontally and laterally;
   a first feederhouse lift motor (141) coupled to the chassis (144) at a first end of the first feederhouse lift motor (141) and coupled to the front frame (120) at a second end of the first feederhouse lift motor (141); and
   a first pivot motor (152) coupled to the front end (132) at a first end of the first pivot motor (152), and coupled to the front frame (120) at a second end of the first pivot motor (152);
   Wherein the pivot motor (152) is disposed such that when actuated the front frame (120) is tilted in a first direction about the second pivot axis (138) and causes the feederhouse (104) to pivot in a second and opposite direction about the first pivot axis (129).

2. The combine harvester (100) of claim 1, wherein the feederhouse (104) encloses an endless belt conveyor (110).

3. The combine harvester (100) of claim 2, wherein the endless belt conveyor (110) comprises an endless belt (116), and further comprises a front roller (112) and a rear roller (114) about which the endless belt (116) recirculates.

4. The combine harvester (100) of claim 3, wherein the front roller (112) rotates about a rotational axis, and further wherein the rotational axis of the front roller is coaxial with the second pivot axis (138).

5. The combine harvester (100) of claim 3, wherein the rear roller (114) rotates about a rotational axis and further wherein the rotational axis of the rear roller (114) is coaxial with the first pivot axis (129).

6. The combine harvester (100) of claim 1, wherein the second end of the first feederhouse lift motor (141) is coupled to the front frame (120) to pivot about a third pivot axis (151) with respect to the front frame (120).

7. The combine harvester (100) of claim 6, wherein the first end of the first feederhouse lift motor (141) is coupled to the chassis (144) to pivot about a fourth pivot axis (145) with respect to the chassis (144).

8. The combine harvester (100) of claim 6, wherein the third pivot axis (151) is disposed below the second pivot axis (138).

9. The combine harvester (100) of claim 7, wherein the third pivot axis (151) is disposed below the second pivot axis (138), and further wherein the fourth pivot axis (145) is disposed below the first pivot axis (129).

10. The combine harvester (100) of claim 7, wherein a distance between the second pivot axis (138) and the third pivot axis (151) is less than or equal to the distance between the first pivot axis (129) and the fourth pivot axis (145).

11. The combine harvester (100) of claim 1, wherein the front frame is configured to support a harvesting head (106) having a front portion and a rear portion.

12. The combine harvester (100) of claim 11, wherein the first pivot motor (152), when actuated, is disposed to raise or lower the rear portion of the harvesting head (106) while maintaining the front portion of the harvesting head (106) at a constant height.

13. The combine harvester (100) of claim 11, wherein the first pivot motor (152) is disposed to pivot the harvesting head (106) with respect to the ground about an instantaneous axis of rotation (162) that is disposed adjacent to the front portion of the harvesting head (106).

14. The combine harvester (100) of claim 13, wherein the harvesting head (106) comprises a cutter bar (164), and further wherein the instantaneous axis of rotation (162) is disposed adjacent to the cutter bar (164).

15. The combine harvester of claim 13, wherein the instantaneous axis of rotation (162) extends horizontally and transversely.

* * * * *